(12) United States Patent
Mane et al.

(10) Patent No.: US 12,037,980 B2
(45) Date of Patent: Jul. 16, 2024

(54) METHOD FOR RETROFITTING A WIND TURBINE WITH AN ENERGY GENERATING UNIT

(71) Applicant: Vestas Wind Systems A/S, Aarhus N (DK)

(72) Inventors: Siddhesh Gopal Mane, Kolhapur (IN); Nibedita Sahoo, Chennai (IN)

(73) Assignee: Vestas Wind Systems A/S, Aarhus N. (DK)

( * ) Notice: Subject to any disclaimer, the term of this patent is extended or adjusted under 35 U.S.C. 154(b) by 212 days.

(21) Appl. No.: 17/775,929

(22) PCT Filed: Dec. 15, 2020

(86) PCT No.: PCT/DK2020/050363
§ 371 (c)(1),
(2) Date: May 11, 2022

(87) PCT Pub. No.: WO2021/121505
PCT Pub. Date: Jun. 24, 2021

(65) Prior Publication Data
US 2022/0381225 A1      Dec. 1, 2022

(30) Foreign Application Priority Data

Dec. 16, 2019 (DK) .............................. PA201970773

(51) Int. Cl.
*F03D 13/20* (2016.01)
*E04H 12/34* (2006.01)

(52) U.S. Cl.
CPC ........... *F03D 13/20* (2016.05); *E04H 12/342* (2013.01); *F05B 2230/80* (2013.01); *F05D 2220/76* (2013.01); *F05D 2230/80* (2013.01)

(58) Field of Classification Search
CPC ... F03D 13/20; E04H 12/342; F05D 2220/76; F05D 2230/80
See application file for complete search history.

(56) References Cited

U.S. PATENT DOCUMENTS 10,676,952 B2 * 6/2020 Fang ..................... E04H 12/085
11,415,106 B2 * 8/2022 Baun ..................... E04H 12/342
(Continued)

FOREIGN PATENT DOCUMENTS

| EP | 2703640 A1 | 3/2014 |
|----|------------|--------|
| EP | 2846041 A1 | 3/2015 |

(Continued)

OTHER PUBLICATIONS

Danish Patent and Trademark Office, Search and Examination Report in PA 2019 70773, May 20, 2020.
(Continued)

*Primary Examiner* — Andrew J Triggs
(74) *Attorney, Agent, or Firm* — Wood Herron & Evans LLP

(57) ABSTRACT

A method of retrofitting a wind turbine having a tower and a first energy generating unit with a second energy generating unit. The method includes analyzing a first natural frequency of the tower relative to first rated operation frequencies of the tower having the second energy generating unit; when the first natural frequency lies within the first rated operation frequencies, modifying one or both the tower and the second energy generating unit so that the modified one or both the tower and the second energy generating unit have a second natural frequency and second rated operation frequencies that do not overlap; and replacing the first energy generating unit with the second energy generating unit.

13 Claims, 15 Drawing Sheets

(56) References Cited

U.S. PATENT DOCUMENTS

| | | | |
|---|---|---|---|
| 11,480,158 B2* | 10/2022 | Bachmann | F03D 7/042 |
| 2011/0271634 A1 | 11/2011 | Rasmussen | |
| 2021/0190039 A1* | 6/2021 | San Vicente Larrechi | F03D 17/00 |
| 2022/0381225 A1* | 12/2022 | Mane | F03D 13/10 |

FOREIGN PATENT DOCUMENTS

| | | |
|---|---|---|
| EP | 2908008 A1 | 8/2015 |
| JP | 2017053275 A | 3/2017 |
| WO | 2018184642 A1 | 10/2018 |
| WO | 2018210390 A1 | 11/2018 |
| WO | 2019154469 A1 | 8/2019 |

OTHER PUBLICATIONS

European Patent Office, International Search Report and Written Opinion in PCT Application No. PCT/DK2020/050363, Jun. 1, 2021.

* cited by examiner

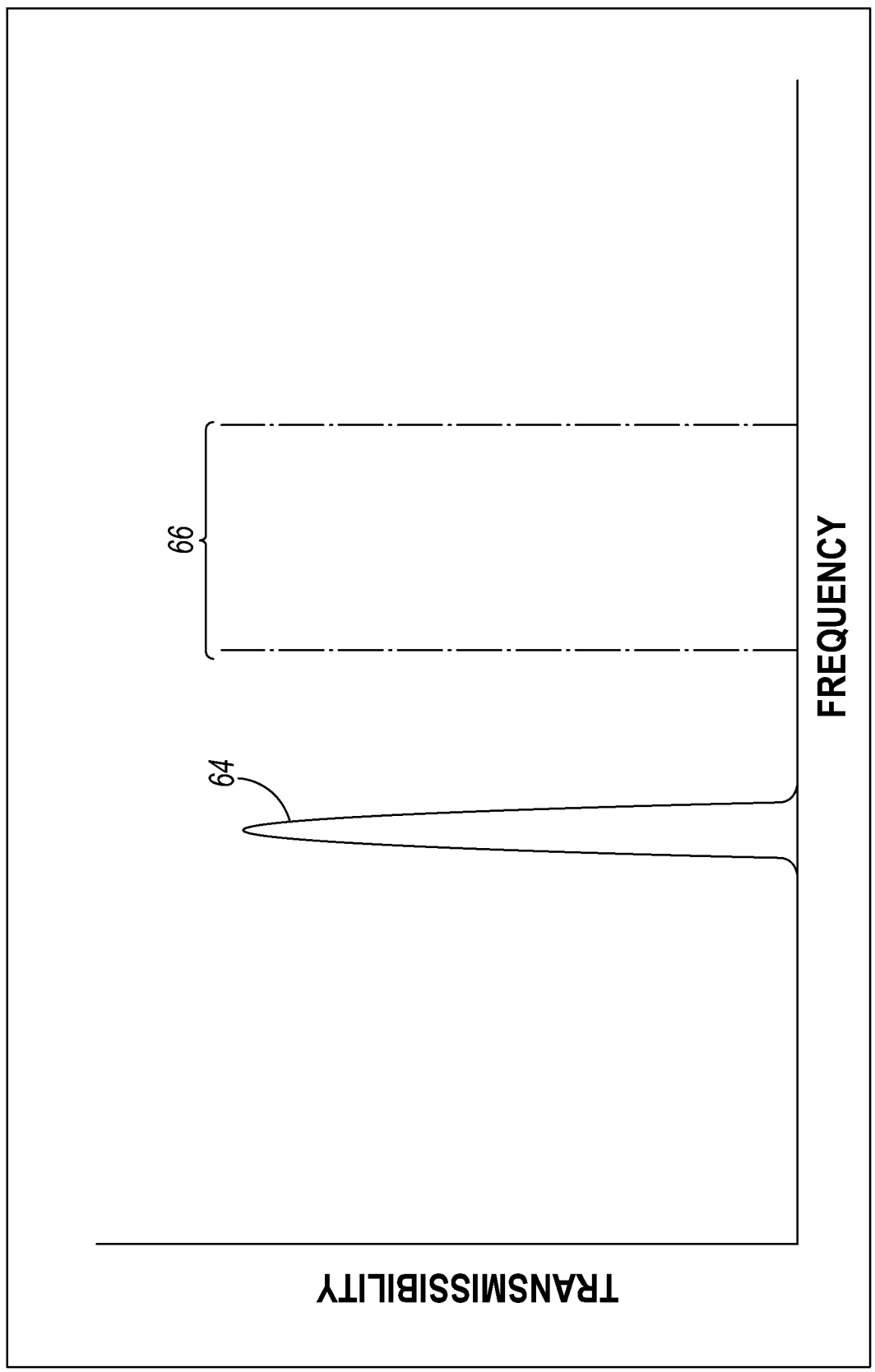

METHOD FOR RETROFITTING A WIND TURBINE WITH AN ENERGY GENERATING UNIT

TECHNICAL FIELD

The invention relates generally to wind turbines, and more particularly to a method of retrofitting a wind turbine having a tower and a first energy generating unit with a second, improved energy generating unit and operating the retrofitted wind turbine in such a manner as to extend the life expectancy of the tower.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower and an energy generating unit positioned atop of the tower. The energy generating unit typically includes a nacelle to house mechanical and electrical components, such as a generator, and a rotor operatively coupled to the components in the nacelle through a main shaft extending from the nacelle. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator.

Oftentimes during a lifetime of a wind turbine, which can span multiple decades, new technology becomes available. As an example, new generation turbines that have a higher electricity production at a lower price (Levelized Cost of Energy—LCOE) become available. At some point, before the end of the lifetime of some components of a wind turbine, it may become economical to replace an old generation turbine with a new generation turbine. This is often done by replacing the entire wind turbine including the foundation. However, this is quite costly, so the wind turbine industry is searching for solutions to improve a business case for retrofitting with a new generation turbine.

SUMMARY

To these and other ends, a method of retrofitting a wind turbine is provided. The wind turbine has a tower and a first energy generating unit. During retrofitting, the first energy generating unit is replaced with a second energy generation unit. The method includes analyzing a first natural frequency of the tower relative to first rated operation frequencies of the tower having the second energy generating unit; when the first natural frequency lies within the first rated operation frequencies, modifying one or both the tower and the second energy generating unit so that the modified one or both the tower and the second energy generating unit have a second natural frequency and second rated operation frequencies that do not overlap; and replacing the first energy generating unit with the second energy generating unit.

In one embodiment, modifying one or both the tower and the second energy generating unit includes increasing a height of the tower from a first tower height to a second tower height, the difference in height between the first tower height and the second tower height being sufficient to reduce the first natural frequency to the second natural frequency and the second natural frequency is not within the second rated operation frequencies. By way of example, modifying the tower may include adding an adapter to the tower to increase the first tower height to the second tower height.

In one embodiment, modifying one or both the tower and the second energy generating unit includes decreasing a height of the tower from a first tower height to a second tower height, the difference in height between the first tower height and the second tower height being sufficient to reduce the first natural frequency to the second natural frequency and the second natural frequency is not within the second rated operation frequencies.

In one embodiment, the tower has at least a first section and a second section and adding the adapter to the tower includes positioning the adapter between the first section and the second section. The adapter may be generally cylindrical in this embodiment. In an alternative embodiment, adding the adapter to the tower includes positioning the adapter at a top of the tower and replacing the first energy generating unit with the second energy generating unit includes coupling the second energy generating unit to the adapter. The adapter may be generally conical in this embodiment.

Moreover, in one embodiment, the tower has at least a first section and a second section and adding the adapter to the tower includes removing the first energy generating unit and the first section, coupling the adapter to one of the first section and the second section and coupling the other of the first section and the second section to the adapter, the adapter being between the first section and the second section.

In yet a further embodiment, the tower is coupled to a foundation and adding the adapter to the tower includes positioning the adapter between the tower and the foundation and replacing the first energy generating unit with the second energy generating unit includes coupling the second energy generating unit to the tower. The adapter may be generally cylindrical or conical in this embodiment.

In one embodiment, modifying one or both the tower and the second energy generating unit includes limiting an operating parameter of the second energy generating unit to change a limit of the second rated operation frequencies to be below or above the second natural frequency. More specifically, modifying one or both the tower and the second energy generating unit includes limiting an operating parameter of the second energy generating unit to increase a lower limit of the second rated operation frequencies to a frequency above the second natural frequency. By way of example, altering the operation of the wind turbine so as to change the rated operation frequency may include pitching one or more blades on the second energy generating unit. Alternatively, altering the operation of the wind turbine so as to change the rated operation frequency on the tower may include limiting the speed of the rotor on the second energy generating unit.

In a further embodiment, a method of retrofitting a wind turbine having a first energy generating unit with a second energy generating unit, wherein the wind turbine includes a modular tower with at least a first section and a second section, includes inserting an adapter between the first section and the second section to increase the height of the tower, and coupling the second energy generating unit to one of the first section and the second section.

In yet another embodiment, a wind turbine includes a modular tower having at least two conical sections configured to be coupled to a cylindrical section, wherein the cylindrical section is configured to be between the at least two conical sections. The wind turbine may further include a second cylindrical section configured to be coupled between one of the conical sections and a foundation. An energy generating unit is configured to be coupled to the other conical section.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

FIG. 3A is a schematic diagram of a natural frequency and rated operation frequencies of the wind turbine shown in FIG. 1;

DETAILED DESCRIPTION

Figure 1A:
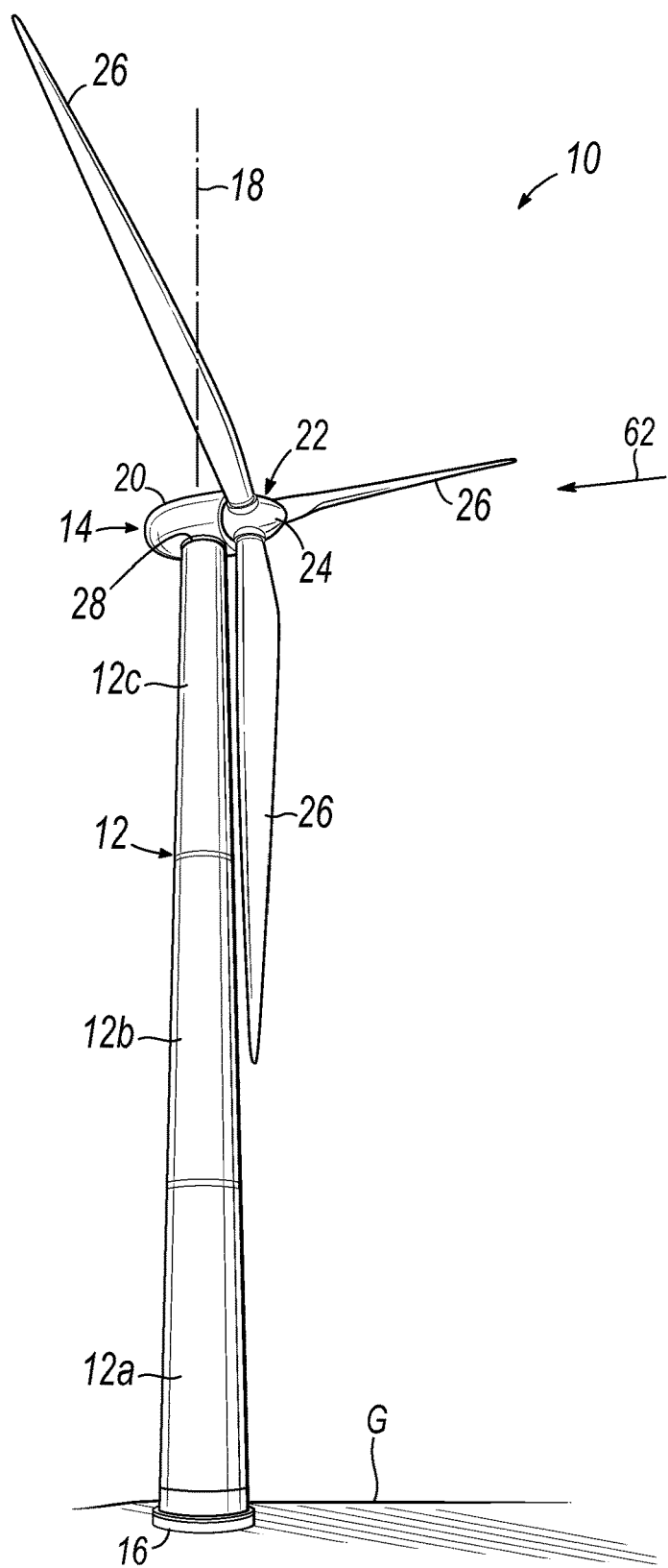
FIG. 1 is a perspective view of a wind turbine having a tower and a first energy generating unit.
Figure 1B:
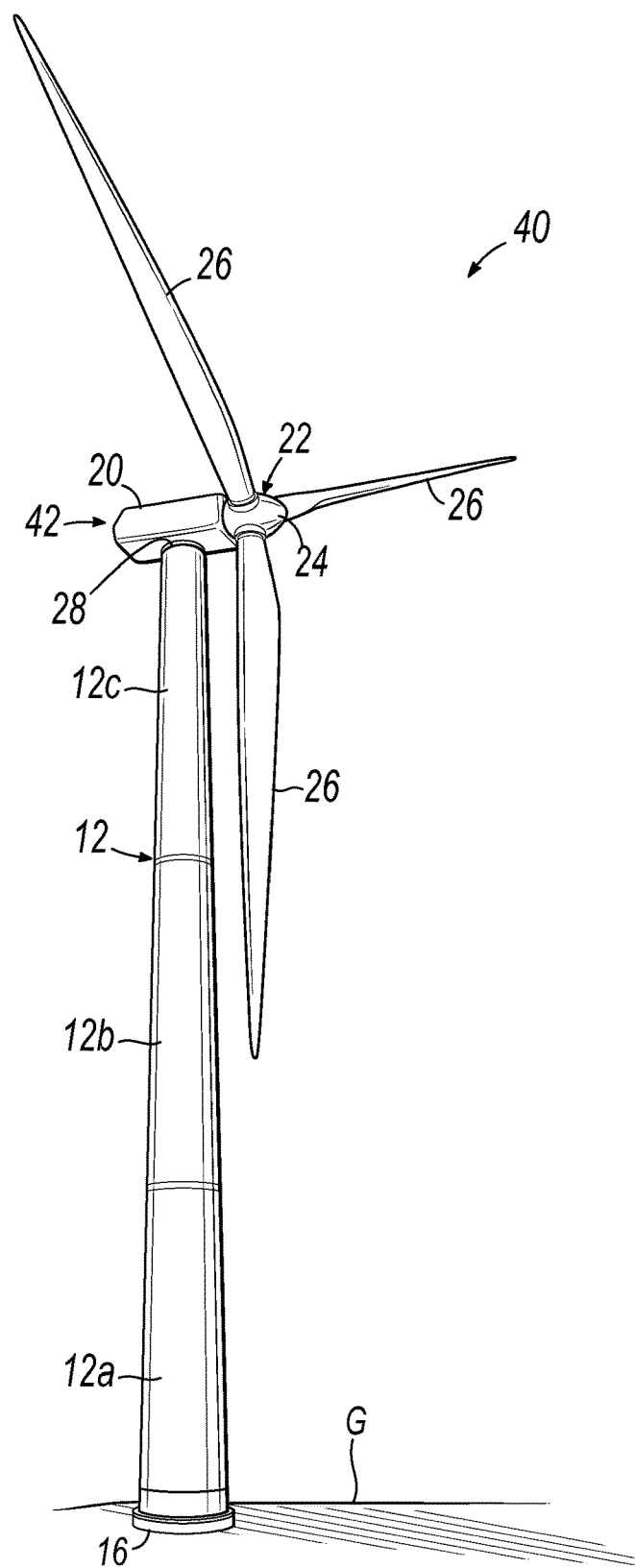

With reference to FIG. 1, a wind turbine 10 includes a modular tower 12 and an energy generating unit 14 disposed at the apex of the tower 12. As is conventional, the modular tower 12 may be coupled to a foundation 16 at a lower end thereof. The exemplary modular tower 12 includes three sections 12a, 12b, and 12c that collectively define a generally vertical tower axis 18 about which the energy generating unit 14 may rotate via a yaw mechanism (not shown). The foundation 16 may be a relatively large mass, e.g., concrete, steel, etc., embedded in the ground and through which forces on the wind turbine 10 may be ultimately transferred. Although not shown, in an alternative embodiment, the foundation 16 may include an offshore platform or the like used in offshore wind turbine applications. The energy generating unit 14 includes the part of the wind turbine which transforms the energy of the wind into electrical energy. In this regard, the energy generating unit 14 typically includes a housing or nacelle 20, a rotor 22 having a central hub 24 and one or more blades 26 (e.g., three blades) mounted to the central hub 24 and extending radially therefrom, and a generator (not shown) for converting mechanical energy into electrical energy. In one embodiment, the energy generating unit 14 may further include a drive train (not shown), including a gear arrangement, interconnecting the rotor 22 and the generator. The generator and a substantial portion of the drive train may be positioned inside of the nacelle 20 of the wind turbine 10. In addition to the generator, the nacelle 20 typically houses miscellaneous components required for converting wind energy into electrical energy and various components needed to operate, control, and optimize the performance of the wind turbine 10. The wind turbine blades 26 are configured to interact with a free stream air flow (the wind 62) to produce lift that causes the rotor 22 to spin or rotate generally within a plane defined by the wind turbine blades 26. Thus, the energy generating unit 14 is able to generate power from the airflow that passes through the swept area of the rotor 22. The energy generating unit 14 is attached to the tower 12 at a top flange 28. The tower 12 supports the load presented by the energy generating unit 14 and operates to elevate the energy generating unit 14, and especially the rotor 22, to a height above ground level or sea level at which faster moving air currents of lower turbulence are typically found.

Figure 2:
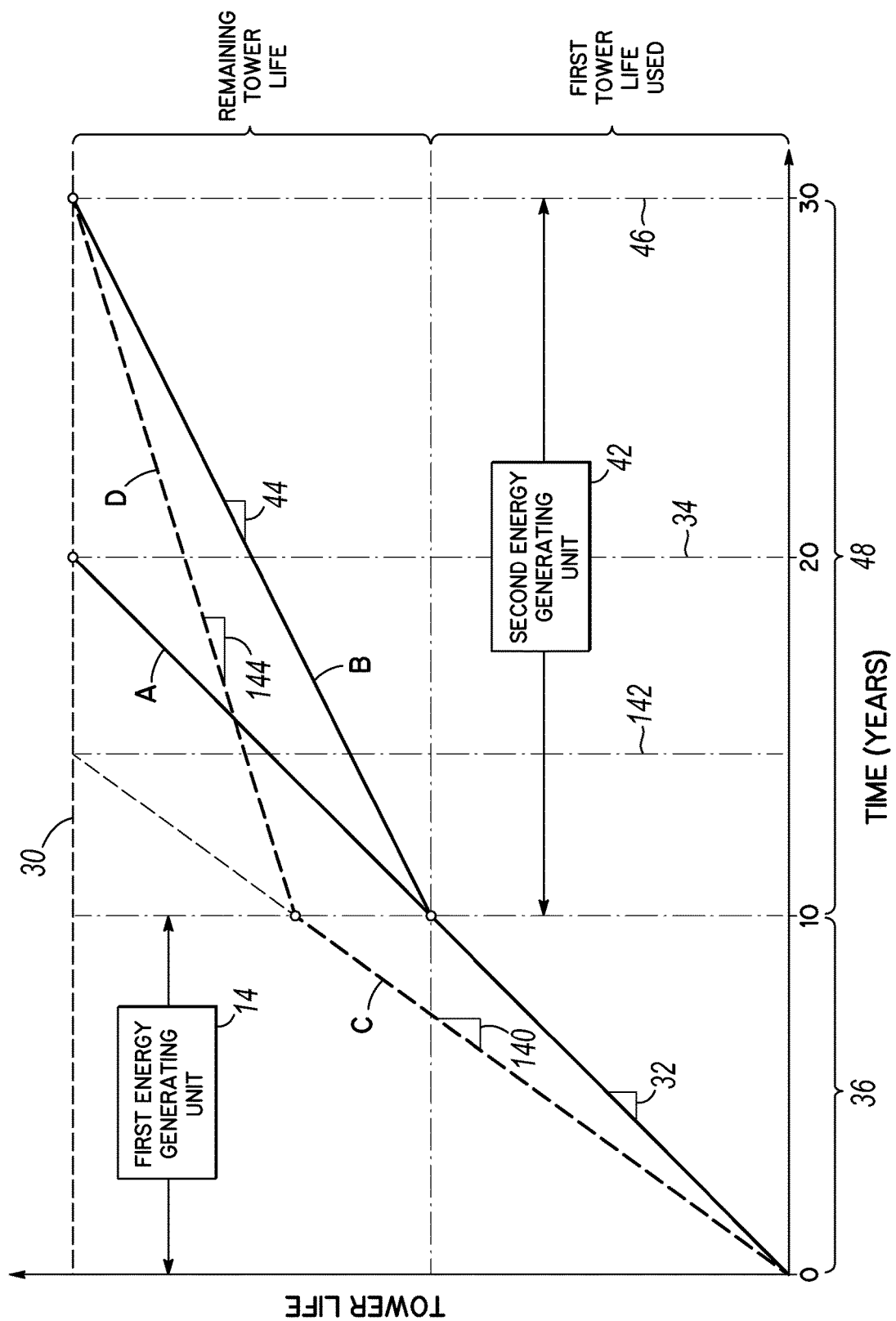
FIG. 2 is a perspective view of a wind turbine having the tower of FIG. 1 retrofit with a second energy generating unit.

At some point in the lifetime of the wind turbine, an existing wind turbine may be replaced. During a retrofit process, an existing energy generating unit may be replaced with another, improved energy generating unit. This is shown, by way of example, in FIG. 2. A retrofit approach calls for the same tower 12 to be used for a second energy generating unit 42. A retrofitted wind turbine 40 should be operated in a manner that extends the service life of the tower 12 at least to and preferably beyond the life expectancy design value of the tower 12.

To this end, the inventors identified a problem that must be analyzed prior to installation of the second energy generating unit 42 on the tower 12. That issue involves consideration of a natural frequency of a wind turbine relative to a range of rated operation frequencies of the wind turbine 40 with a new energy generating unit 42 following a retrofit process, described below. Rated operation frequencies are vibrational frequencies that are produced during optimal power generation of the wind turbine. The new energy generating unit, when installed on an existing tower, must not produce rated operation frequencies that overlap the natural vibration frequency of the new energy generating unit on the wind turbine tower during normal operation of the retrofitted wind turbine. A natural frequency of the wind turbine is the frequency at which the wind turbine tower will oscillate in the absence of any driving or damping force.

In general and with reference to FIG. 1, as the rotation of the rotor 22 increases, the vibration frequency on the wind turbine tower 12 increases. Vibration on the wind turbine tower 12 may be due to the periodic motion of each blade 26 as it sweeps past the tower 12. At startup, the rotation frequency of the rotor 22 increases from a stationary position. The rotation of the rotor 22 increases until it reaches an optimal rotational rate at which power output is optimized. This occurs at a predetermined wind speed, which is determined by a rated speed of the rotor 22. Power output from the wind turbine 10 is held relatively constant in variable wind conditions by controlling a pitch of the blades 26. Thus, with variation in wind speed, the blades 26 may be pitched to maintain optimal rotation rate. Although there are controls designed to optimize power production, for example, blade pitch control, during optimal power generation there is still some variation in rotational frequency of the rotor 22. That is, during nominal operation there is some variation in the rated operation frequency on the wind turbine tower 12. This variation produces a range in the rated operation frequencies. As is referenced herein, a rated operation frequency does not include vibrational frequencies on the wind turbine tower 12 during startup or shutdown. Each of these can cause vibrational frequencies that can coincide with the natural frequency of the wind turbine tower. However, the time of coincidence is short because the rotor 22 rotation rate is increasing toward optimal rotation rate at which the rated operation frequencies are produced or the rotation rate is decreasing toward a stationary position from the optimal rotation rate.

As an example and with reference to the exemplary wind turbine 10 of FIGS. 1 and 3A, the wind 62 moves the nacelle 20. That is, the wind 62 causes the tower 12 to flex (in the direction of the arrow 62) so that the nacelle 20 is displaced from the axis 18. In addition to that periodic displacement motion, the wind rotates the rotor 22. Rotor rotation produces periodic vibrations that are transmitted throughout the wind turbine 10, including the tower 12. Considering the wind turbine 10, the tower 12 has a natural frequency 64 (FIG. 3A). If the tower 12 is subject to an external periodic force (e.g., the wind 62 and/or rotor rotation) at close to its natural frequency 64, the tower 12 will resonate. For that reason, as shown in FIG. 3A, the wind turbine 10 is designed with the natural frequency 64 outside of rated operation frequencies 66 of the wind turbine 10. The rated operation frequencies 66 result from the rotation of the rotor 22, described above, during optimal power generation. As shown, there is no overlap between the natural frequency 64 and a range of the rated operation frequencies 66. The tower 12 is designed to resonate at a frequency that does not typically occur during optimal power generation of the wind turbine 10. This design avoids excessive vibrations, ones that may result in degradation of the tower 12 from resonance during operation. In this way, the life of the wind turbine tower 12 may be prolonged.

While the rated operation frequencies 66 illustrated in FIG. 3A span a range of frequencies above 0 Hz and above the natural frequency 64, it will be appreciated that these are not the only frequencies that the wind turbine 10 produces during operation. As is described above, for example, prior to startup, the rotor 22 is stationary. During startup, the rotational rate of the rotor 22 increases, and as the rotor 22 spins up toward a rotation rate for optimal power generation, the vibrational frequencies experienced by the wind turbine 10 may overlap the natural frequency 64. This is typically a momentary occurrence because the rotor rotation rate continues to increase until the optimal rotation rate is reached at which time the wind turbine tower 12 experiences rated operation frequencies 66. Likewise, during shutdown, the rotation rate of the rotor 22 will produce a vibrational frequency that momentarily overlaps with the natural frequency 64 as the rotation rate of the rotor 22 slows down. In this regard, the rated operation frequencies 66 represent a nominal operational range of vibrational frequencies experienced by the wind turbine 10 during optimal power generation. The rated operation frequencies exclude those frequencies observed during startup and shutdown of the wind turbine 10.

Upon retrofitting the wind turbine 10 with the second energy generating unit 42, as is described below, the goal is to maximize power production until the life expectancy of the second energy generating unit 42 and/or the tower 12 are reached (as noted above, preferably they reach the end of their service life together). In that regard, the goal is to extend the life of the tower 12 as long as possible. To that end, the natural frequency 64 is considered relative to a prediction of rated operation frequencies of the tower with the second energy generating unit 42. Depending upon the result of that analysis, a number of scenarios are possible to address an overlap between rated operation frequencies and the natural frequency of the tower with the second energy generating unit 42.

Figure 3B:
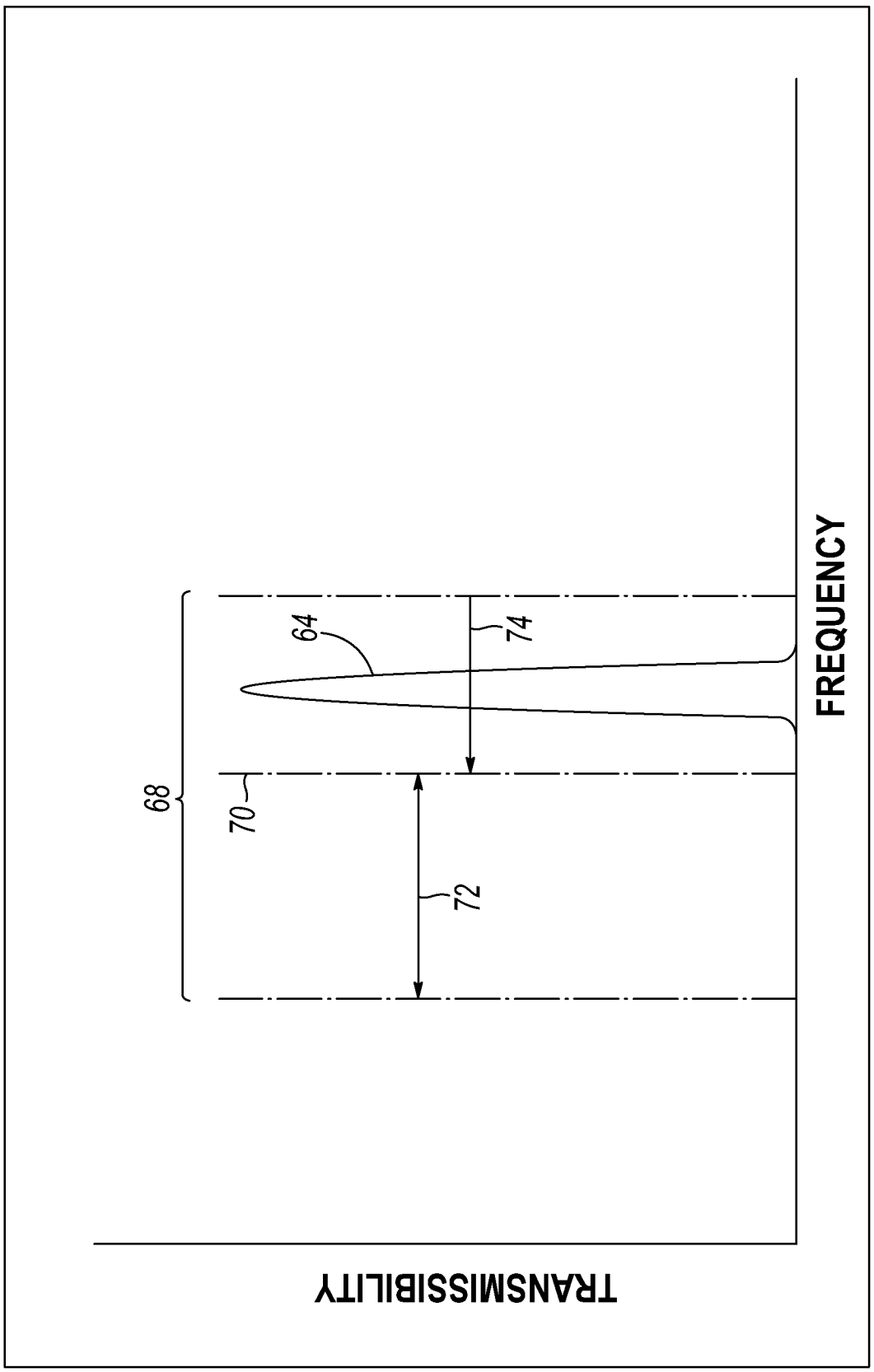
FIG. 3B is a schematic diagram of a natural frequency of an existing tower and rated operation frequencies following retrofitting according to one embodiment of the present invention.

To that end, as shown in FIG. 3B, when the tower 12 is retrofitted with the second energy generating unit 42, the new wind turbine 40 will likely have new rated operation frequencies 68. The new rated operation frequencies 68 could present a problem with regard to the natural frequency 64 of tower 12. The natural frequency 64 of the tower 12 depends primarily on a stiffness and a mass of the tower 12. While not being bound by theory, it is believed that replacing the energy generating unit 14 with the second energy generating unit 42 has a negligible effect on the natural frequency 64 of the tower 12 (i.e., the natural frequency does not change appreciably), but the second energy generating unit 42 can cause a significant shift in the rated operation frequencies 68 relative to the rated operation frequencies 66 because of the improved efficiencies provided with the second energy generating unit 42. However, it is noted that if a new energy generating unit has a mass that is significantly different from the existing energy generating unit, a shift in the natural frequency may occur.

By way of example and with continued reference to FIG. 3B, the new rated operation frequencies 68 of the wind turbine 40 with the new second energy generating unit 42 in the absence of modifications to the tower 12 can encompass the natural frequency 64 of the tower 12. That is, an analysis of the operation of the wind turbine 40 via modeling or other mathematical means may reveal that at certain wind velocities one or more of the rated operation frequencies will approach or even coincide with the natural frequency 64 of the tower 12. Overlap of the rated operation frequency 68 with the natural frequency 64 is to be avoided if the life of the tower 12 is to be maintained or prolonged.

To that end, the inventors have developed solutions that address the overlap of the rated operation frequencies 68 and the natural frequency 64 of the tower 12 during a retrofit process. Generally, the solution involves shifting the natural frequency 64 of the tower 12 by modifying the tower 12 and/or shifting the rated operation frequencies 68 of the retrofitted wind turbine 40. By modifying either of the natural frequency or the rated operation frequencies, an overlap between the two is avoided.

One method of shifting the rated operation frequencies 68 is via control of the operation of the retrofitted wind turbine 40. As noted above, the tower life rate depends on the vibrational frequencies being imposed on the tower 12 during operation of the retrofitted wind turbine 40. The imposed vibrational frequencies on the tower 12 may be controlled to a certain extent through operation of the wind turbine 40. With reference to FIG. 3B, once the rated operation frequencies 68 are known or determined, they may be compared to the natural frequency 64 of the tower 12 (such as in the memory of a controller; see below). With that information, any overlap between the rated operation frequencies 68 and the natural frequency 64 of the tower 12 can be determined. Operation of the wind turbine 40 may be controlled to change the rated operation frequencies 68 to frequencies different from (e.g., lower or higher than) the natural frequency 64 of the tower 12. As an example, the operation frequencies may be changed by changing the speed of the rotor 22.

Figure 4:
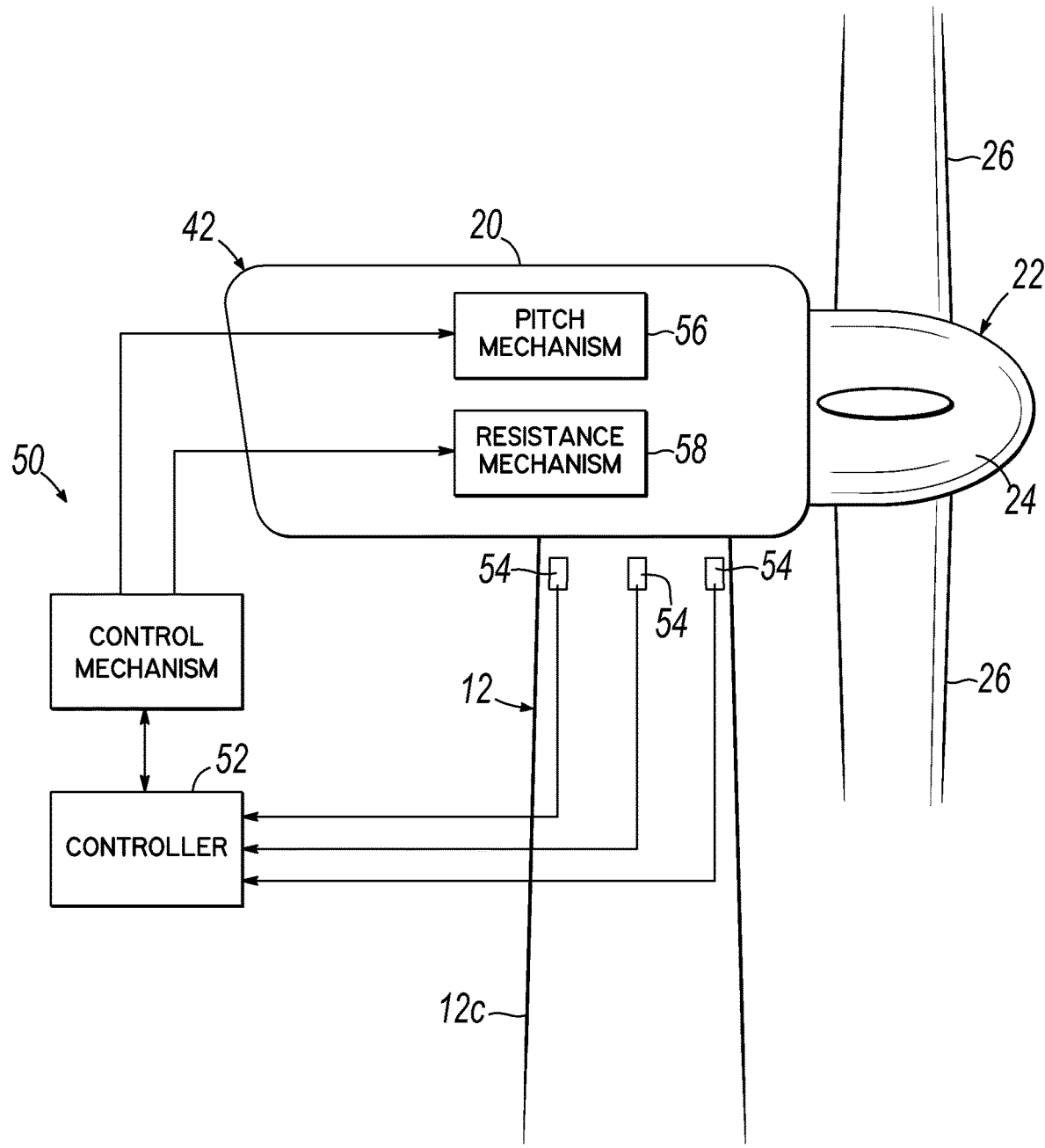
FIG. 4 illustrates an exemplary system for controlling an energy generating unit.

In an exemplary embodiment and with continued reference to FIGS. 3B and 4, an exemplary system 50 may monitor the vibrational frequencies acting on the tower 12, including the rated operation frequency of the wind turbine 40. In this regard, the system 50 includes a central controller 52 and one or more sensors 54 operatively coupled to the wind turbine 40 and configured to indicate, directly or indirectly, the vibrations of the tower 12. By way of example, the sensors 54 may be directly coupled to the tower 12 in one embodiment. In an alternative embodiment, however, the sensors 54 may be coupled to another part of the wind turbine 40 but configured to measure a parameter that correlates to the vibrations acting on the tower 12 (e.g., accelerometers located in the nacelle 20). The central controller 52 may be the primary controller for the wind turbine 40 or may be a separate controller which is operatively coupled to the primary controller of the wind turbine 40.

As shown, the controller 52 may be operatively coupled to a pitch mechanism 56 capable of pitching one or more of the blades 26 on the second energy generating unit 42. By pitching the blades 26 in an appropriate manner, wind energy may be harnessed (i.e., captured by the wind turbine) to maintain the rotation rate of the rotor 22. This may establish a lower limit 70 (FIG. 3B) on the rated operation frequencies to narrow the rated operation frequencies 68 to a new rated operation frequencies 72. In this case, a lower limit of the rated operation frequencies 68 is increased according to arrow 74 so that the lower limit 70 of the rated operation frequencies 72 is greater than the natural frequency 64 of the tower 12. In this way, overlap of the rated operation frequencies 72 and the natural frequency 64 of the tower 12 is avoided. As shown, the controller 52 is operatively coupled to a resistance mechanism 58 (e.g., a generator) that provides resistance to the rotation of the rotor 22 and thus controls the speed at which the rotor 22 rotates.

Another solution that may be used separately or in conjunction with the system 50 shown in FIG. 4 is to change a mass or a stiffness of the tower 12 during the retrofit process. That is, during retrofit to install the second energy generating unit 42, one or both of the mass or stiffness of the tower 12 is modified. This structural modification to the tower 12 shifts the natural frequency away from the rated operation frequencies of the wind turbine 40.

Figure 3C:
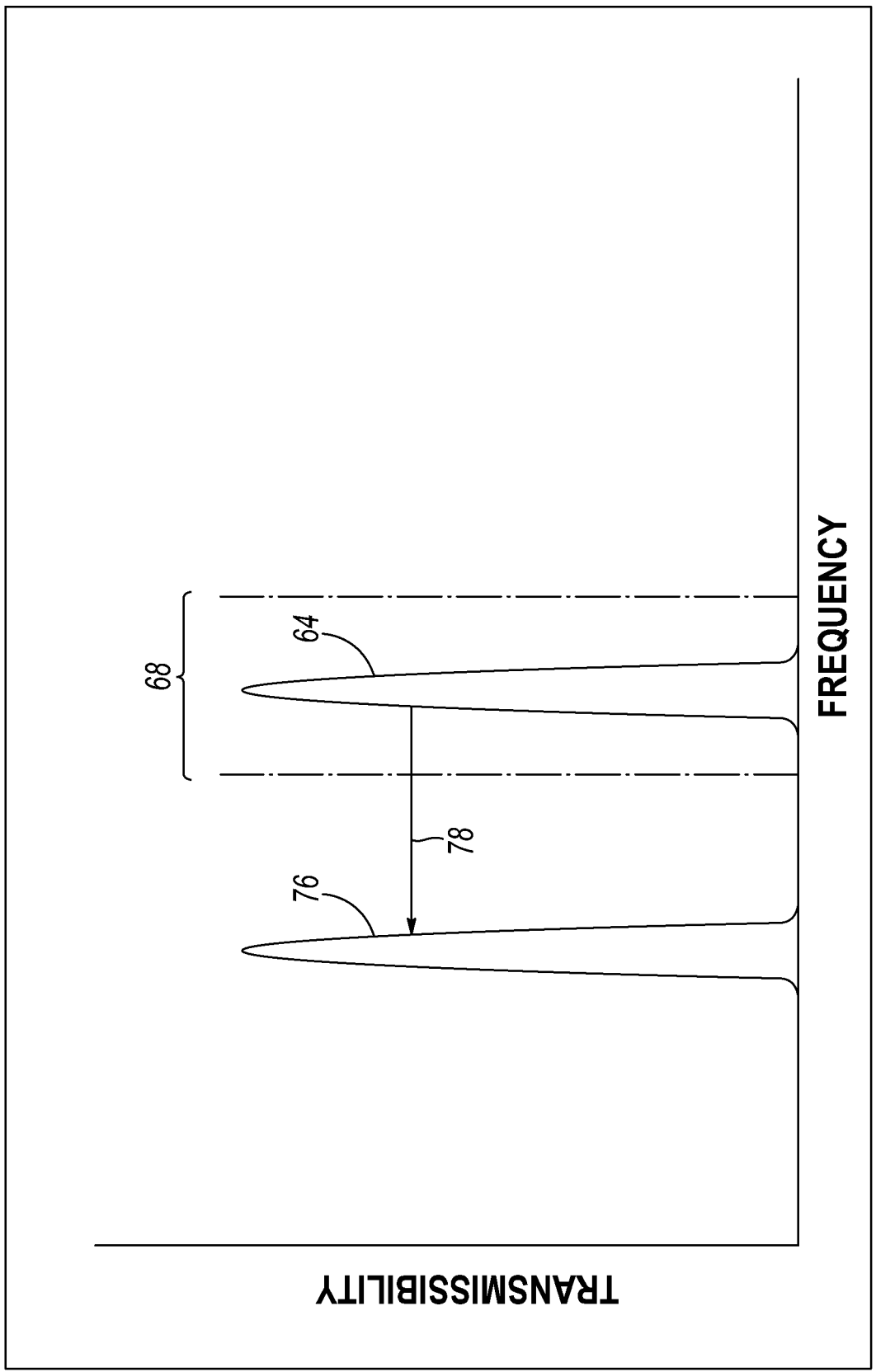
FIG. 3C is a schematic diagram of a natural frequency of an existing tower and the natural frequency following tower modification according to one embodiment of the present invention.

In FIG. 3C, the natural frequency 64 is shifted away from the rated operation frequencies 68. Specifically, the natural frequency 64 is directly proportional to the stiffness and inversely proportional to the mass of the tower 12. According to an embodiment of the invention, changing one or both of the stiffness and the mass shifts the natural frequency 64 of the tower 12 outside of the rated operation frequencies 68 of the retrofitted wind turbine 40. Stiffness is resistance to deformation. By way of example only, changing the stiffness of the tower 12 may be achieved by changing the height of the tower 12. Increasing the height decreases the stiffness and thus decreases the natural frequency of the tower 12. And, decreasing the height of the tower 12 increases the stiffness and increases the natural frequency.

As is shown in the exemplary embodiment of FIG. 3C, the natural frequency 64 is decreased relative to the rated operation frequencies 68 of the wind turbine 10 by increasing the height of the tower 12. A modified tower 82 is shown in FIGS. 5A-6D and described below. That is, increasing the height decreases the stiffness and the natural frequency decreases. With a sufficient height increase, the new natural frequency 76 of the modified tower is less than the rated operation frequencies 68 following retrofit with the second energy generating unit 42. This is schematically shown by arrow 78 in FIG. 3C. Advantageously, a taller tower may be beneficial for other reasons.

By placing the second energy generating unit 42 higher within the atmosphere where faster air currents and less turbulence exist, it is believed that the annual energy production (AEP) of the wind turbine will be increased as a result of the increased height. The increased height of the tower 12 increases the bending moment acting on the modified tower 82 (e.g., think of a cantilevered beam with a large load on its end) and thus reduces the life of the tower 12. Nevertheless, depending on the particular application, it may be possible to increase the height of the tower 12 and operate the second energy generating unit 42 at a rated power curve such that the modified wind turbine tower and the second energy generating unit 42 reach the end of their service life at the same time.

Figure 5A:
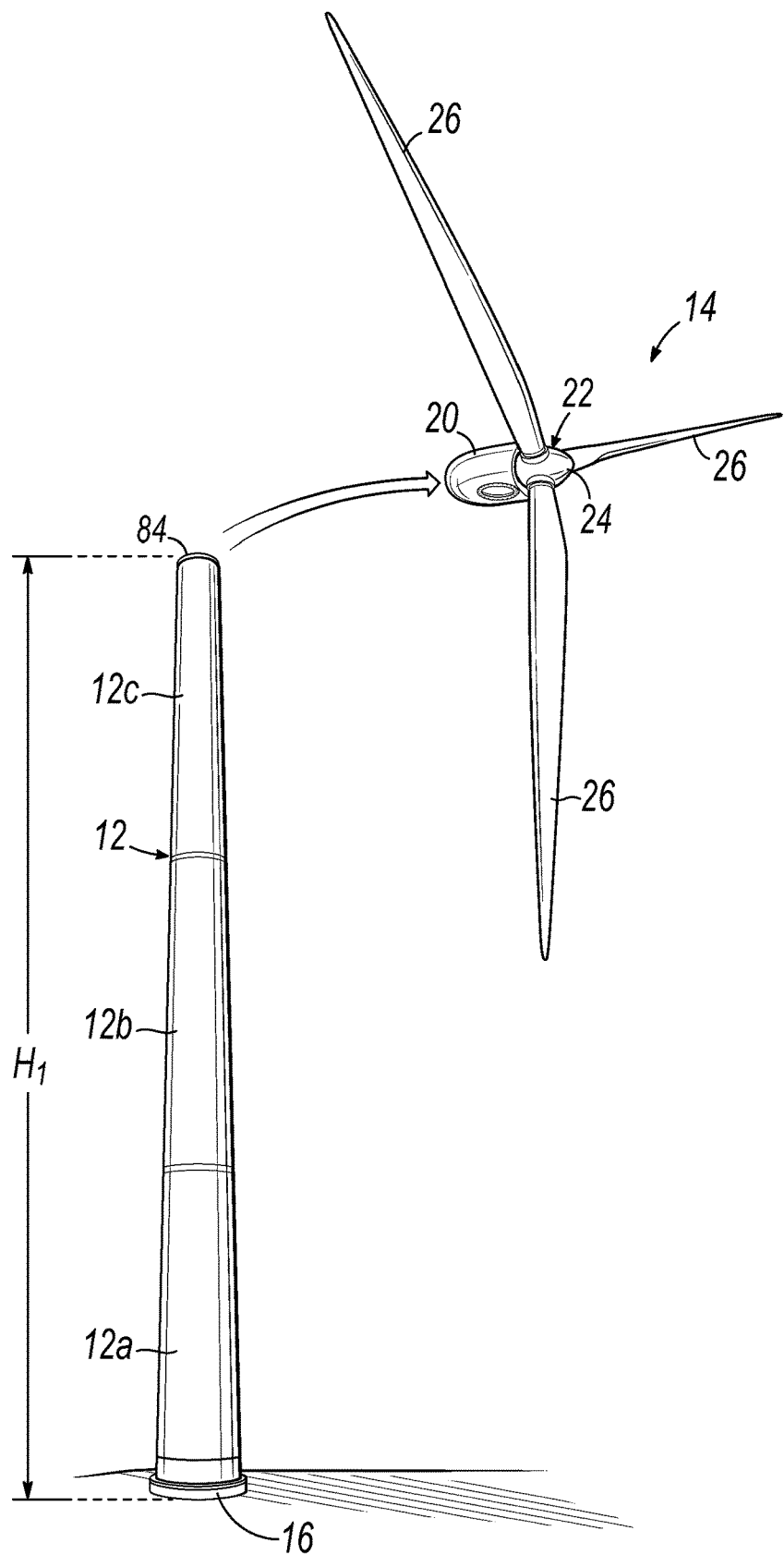
FIGS. 5A, 5B, and 5C illustrate a retrofit process according to one embodiment of the present invention.
Figure 5B:
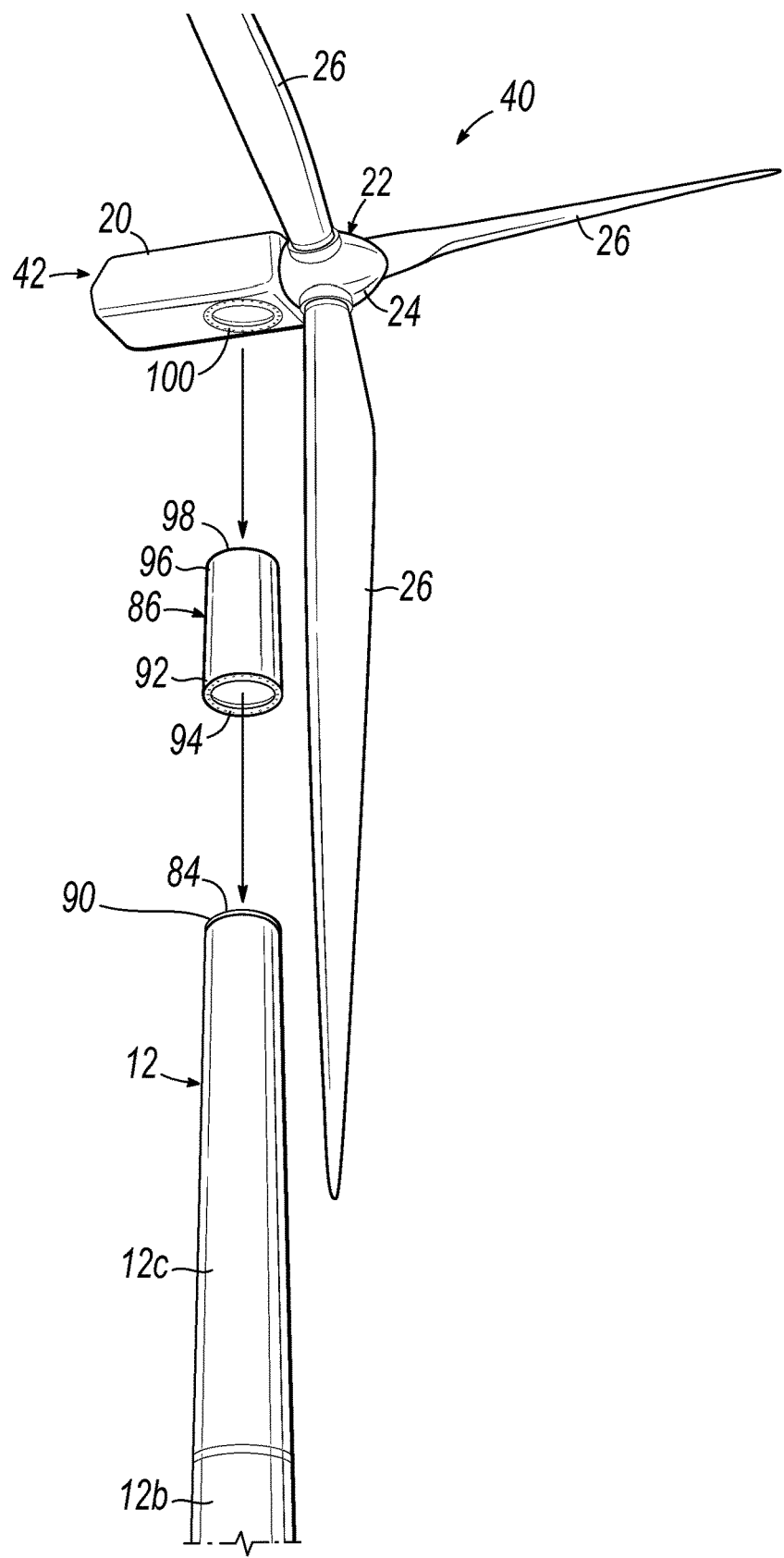
Figure 5C:
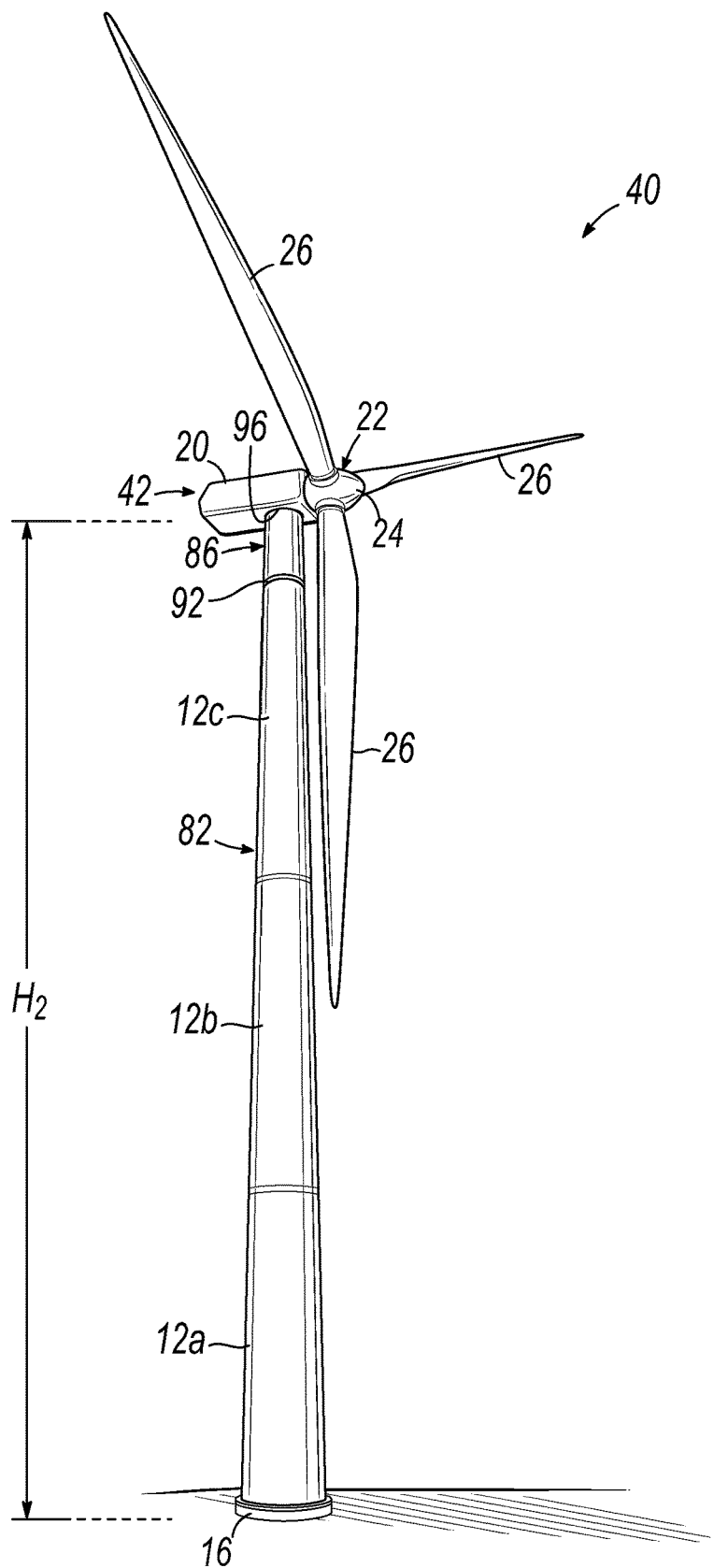

An example of a height modification of the tower 12 in combination with a retrofit to include the second energy generating unit 42 is illustrated in FIGS. 5A-5C. In the figures, a height H1 (FIG. 5A) of the tower 12 is increased to a new height, H2 (FIG. 5C) with the second energy generating unit 42 at the new height H2. Once retrofitted, a modified wind tower 82 (FIG. 5C) corresponds to the natural frequency 76 and rated operation frequencies 68 shown in FIG. 3C. That is, the tower 12 shown in FIG. 1 having a natural frequency 64 is modified during a retrofit process. As a result of the modification, the modified wind turbine tower 82 has height H2 having the natural frequency 76. This natural frequency is below the rated operation frequencies 68 of the modified tower 82 having the second energy generating unit 42 as is shown for example in FIG. 3C.

To that end, in the exemplary retrofit, the tower 12 shown in FIG. 5A is built in sections. In the example shown, the tower 12 includes three sections 12a, 12b, and 12c that collectively define the height H1. Embodiments of the invention are not limited to three sections as a tower with two or more sections may be retrofit as is described herein. With reference to FIG. 5A, in one embodiment, the first energy generating unit 14 is removed from a top end 84 of the tower section 12c. This may be achieved by a crane (not shown) or other lifting device.

In FIGS. 5B and 5C, the height H1 of the tower 12 is increased by adding a tower transition adapter 86 at the top end 84 tower section 12c. That is, the height H2 of the modified tower 82 (shown in FIG. 5C) is equal to the height H1 plus the length of the tower transition adapter 86. In addition to increasing the height relative to the tower 12, the tower transition adapter 86 may also provide geometry matching between the top end 96 of the modified tower 82 and the second energy generating unit 42. By way of example, the second energy generating unit 42 may be from a manufacturer different than the manufacturer of the tower 12 such that a geometry mismatch between the tower 12 and second energy generating unit 42 exists. The tower transition adapter 86 may increase the height of the tower 12 while also remedying a variation in geometry between the first energy generating unit 14 and the second energy generating unit 42.

In this regard and with reference to FIG. 5B, the tower transition adapter 86 includes a first end 92 with a first interface 94 sized for engaging with the interface 90 on the top end 84 of the tower section 12c. The tower transition adapter 86 further includes a second end 96 with a second interface 98 sized for engaging with an interface 100 on the second energy generating unit 42. The tower transition adapter 86 is coupled to the top end 84 of the tower section 12c. More particularly, the first interface 94 at the first end 92 of the tower transition adapter 86 may be coupled to the interface 90 at the top end 84 of the tower section 12c, such as by welding or a flanged connection. In an exemplary embodiment, the interfaces 94, 98 of the tower transition adapter 86 may include a flange (e.g., an annular flange). The interfaces 90, 100 on the tower section 12c and the second energy generating unit 42, respectively, may also include a flange. A fastener, such as a nut/bolt may be used to couple the respective flanges together, as is generally known in the art. In an alternative embodiment, the flanges may be omitted and the tower transition adapter 86 may be coupled to the tower section 12c through welding, for example.

In an exemplary embodiment, to resolve the potential mismatch between the modified tower 82 and the second energy generating unit 42, the size of the interfaces 94 and 98 may be different from each other. More particularly, the diameter of the interfaces 94, 98 may be different. In one embodiment, for example, the diameter of the first interface 94 may be about 3 meters and the diameter of the second interface 98 may be about 4 meters and vice versa. In that regard, the tower transition adapter 86 may have a conical configuration to account for the difference in dimensions. Other sizes and shapes, however, are possible depending on the particular application. Moreover, the length of the tower transition adapter 86 may vary to locate the second energy generating unit 42 at the desired height H2. By way of example, the tower transition adapter 86 may be between about 2 meters and about 30 meters in length. Again, other lengths may be possible depending on the particular application and the desired natural frequency 76 of the modified tower 82 relative to the natural frequency 64 of the tower 12 (shown in FIG. 3C).

Referring to FIG. 5C, with the tower transition adapter 86 attached to the tower section 12c, the height of the modified tower 82 is H2. The height H2 of the modified tower 82 is greater than the height H1 of the tower 12. This produces a decrease in the natural frequency of the modified tower 82 relative to the tower 12. Next, the second energy generating unit 42 may be coupled to the tower transition adapter 86. More particularly, the interface 100 of the second energy generating unit 42 may be coupled to the second interface 98 at the second end 96 of the tower transition adapter 86, such as by welding or a flanged connection, to complete the retrofit process.

It should be recognized that in an alternative embodiment, the second energy generating unit 42 may be coupled to the second end 96 of the tower transition adapter 86 and then that assembly is subsequently coupled to the top end 84 of the tower section 12c. In any event, subsequent to the retrofit process, the retrofitted wind turbine 40 may be returned to service and operated. The retrofitted wind turbine 40 should preferably be operational until the service life of the modified tower 82 and the second energy generating unit 42 have expired. By extending the service life of the wind turbine through the retrofit process, the wind turbine operator may be provided additional time in which to obtain a return on their investment in the wind turbine.

In many regions where wind turbines are located, there may exist local or regional laws, regulations, ordinances, etc. which limit the height at which structures, such as wind turbines, may extend above the ground. These may exist, for example, as a safety precaution to avoid aviation accidents or for other safety considerations. In any event, when increasing the overall height of the retrofitted wind turbine 40, the wind turbine operator may want to verify the blade tip height when one of the blades 26 of the second energy generating unit 42 is at the twelve o'clock position (i.e., at the maximum height of the wind turbine 40) to ensure the retrofitted wind turbine 40 meets the applicable standards. If the tip height of the blades 26 exceed a predetermined threshold established by the laws, regulations, ordinances, etc. in which the retrofitted wind turbine 40 is located, then the height of the tower transition adapter 86 (or possibly even the height of the tower 12, see below) may have to be reduced in order to comply with the applicable laws, regulations, ordinances, etc.

As described above, the tower transition adapter 86 was added to the top end 84 of the tower 12, such that substantially the entirety of the tower 12 is "reused" in the retrofitted wind turbine 40. This represents an efficient use of the existing structure in the retrofit process. The invention, however, is not limited to that embodiment. In this regard and in an alternative embodiment, a portion of the original tower 12 may be removed to establish a new tower interface at which the tower transition adapter 86 may be coupled to change the overall height of the modified tower 82.

Figure 6A:
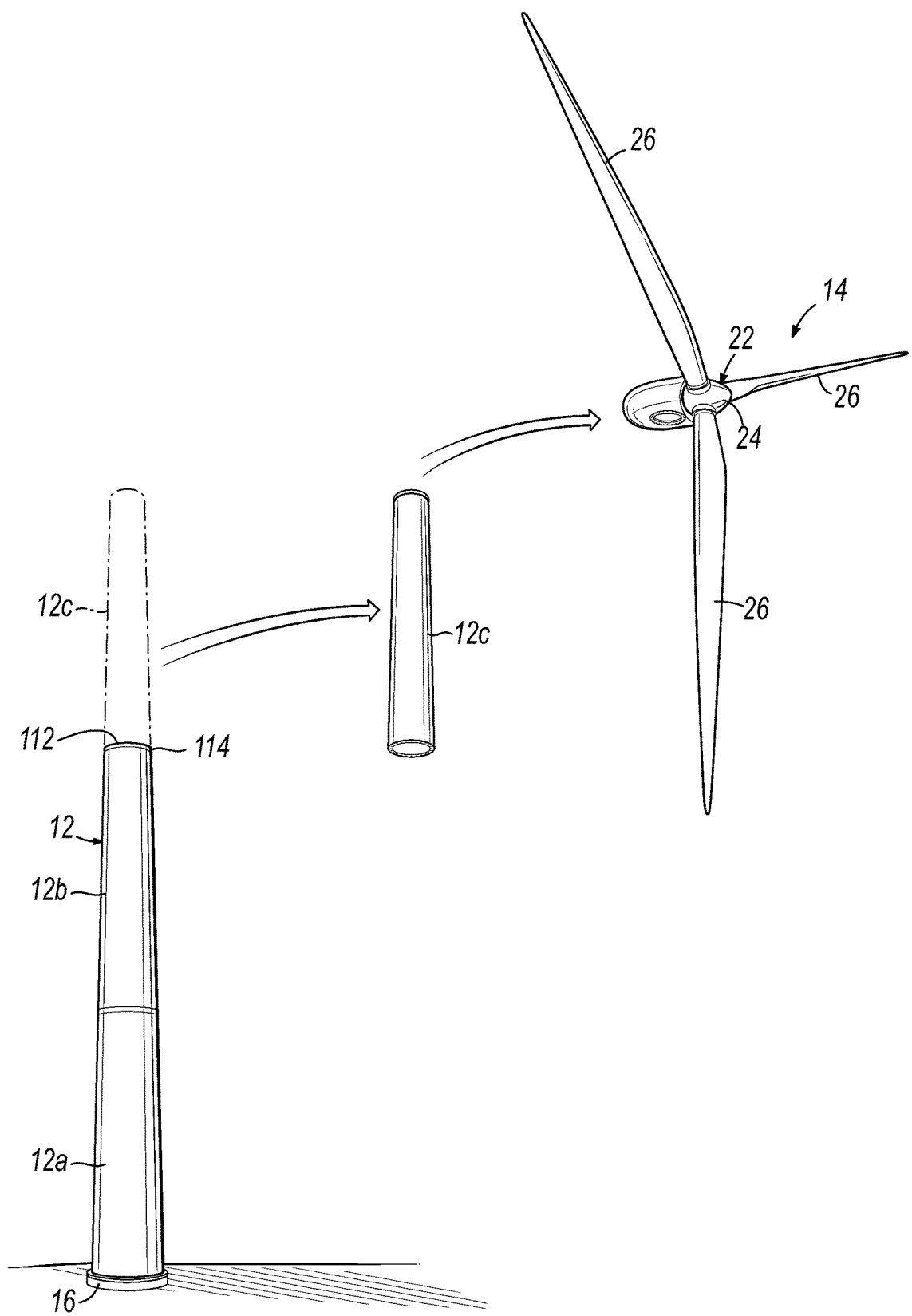
FIGS. 6A, 6B, 6C, and 6D illustrate a retrofit process according to one embodiment of the present invention.
Figure 6B:
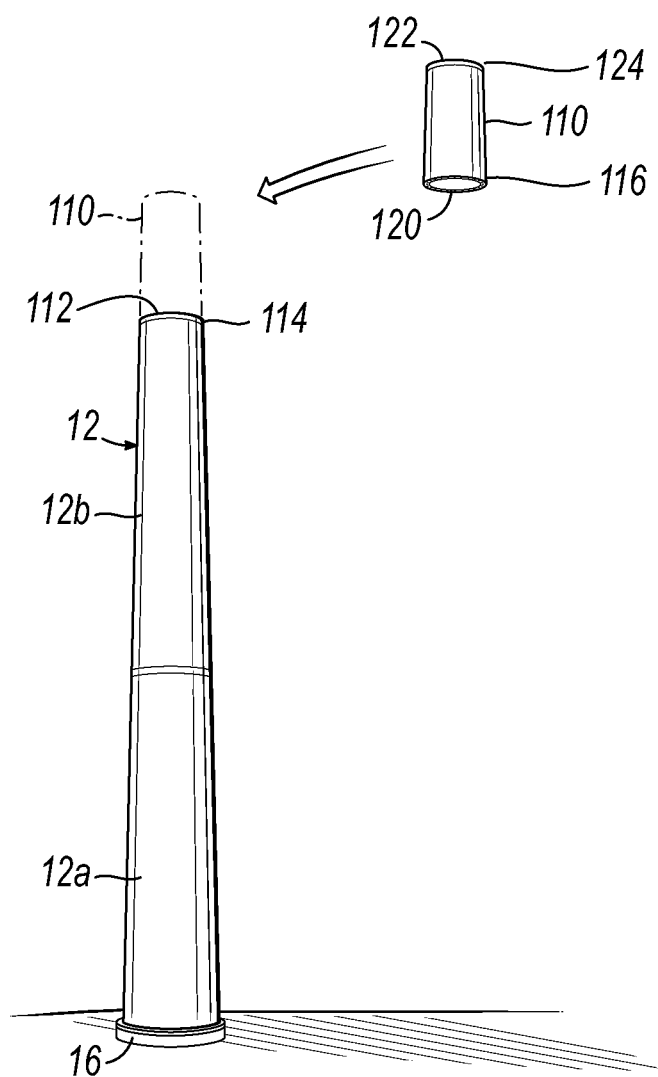
Figure 6C:
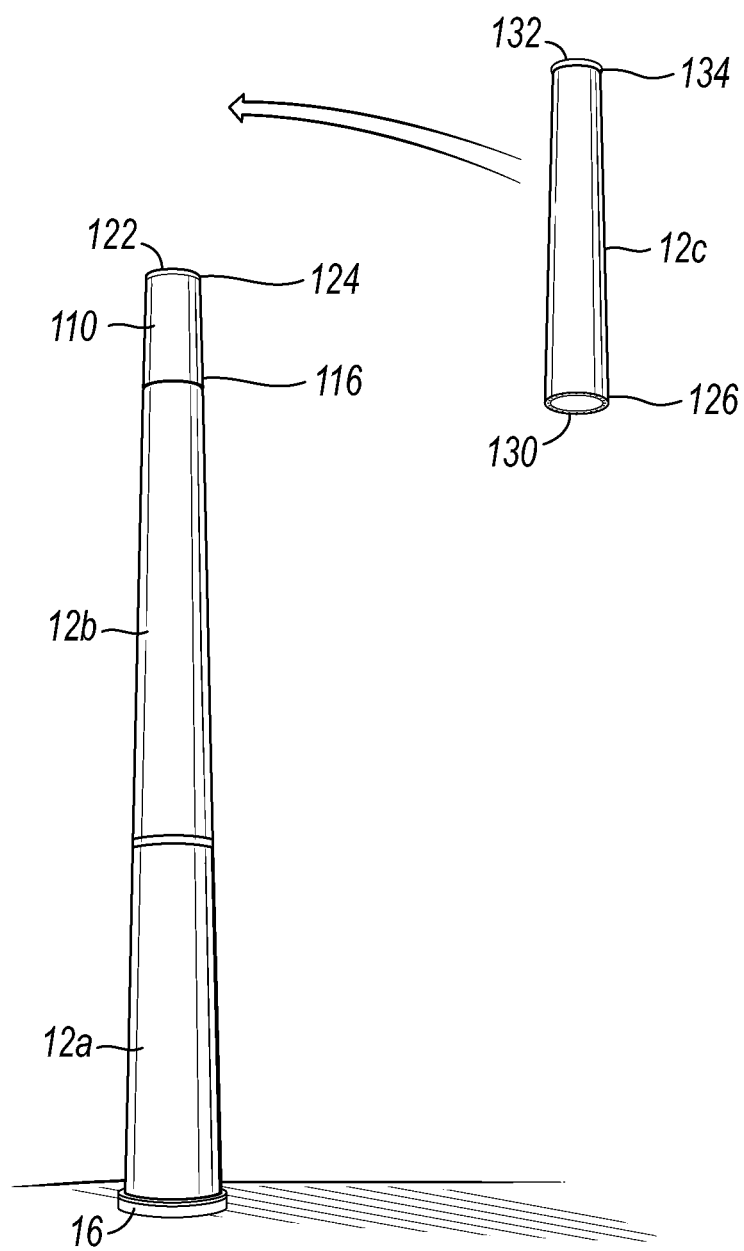

As illustrated in FIGS. 6A-6D, in one embodiment, the height H1 of the tower 12 may be increased by insertion of an adapter at locations other than at the top end 84 of the tower 12. In that regard, any two sections 12a, 12b, and 12c of the tower 12 may be separated and a tower transition adapter 110 may be coupled between the tower sections. By way of example and as illustrated in FIGS. 6A and 6B, the tower transition adapter 110 is inserted between tower section 12b and 12c. Although not shown, a tower transition adapter may be inserted between sections 12a and 12b or between the section 12a and the foundation 16 as is described in conjunction with FIG. 7.

To that end, and with reference to FIGS. 6A and 6B, the energy generating unit 14 and the tower section 12c may be removed. This leaves the remaining tower sections 12a and 12b in position. As shown, a top end 112 of the tower section 12b forms an interface 114 to receive the tower transition adapter 110.

Next, and with reference to FIG. 6B, the tower transition adapter 110 has a first end 116 defining a first interface 120 for coupling to the tower section 12b and has a second end 122 defining a second interface 124. The first interface 120 at the first end 116 of the tower transition adapter 110 is coupled to the interface 114 of the tower section 12b. In the exemplary embodiment shown, the tower transition adapter 110 is cylindrical. As an example, each of the interfaces 120 and 124 define a circle having the same diameter. Advantageously, construction of the tower transition adapter 110 is simplified as the dimensions of each end 116 and 122 do not vary with the length of the tower transition adapter 110. The tower transition adapter 110 may be coupled to the interface 114 via a flanged connection. Alternatively, the tower transition adapter 110 may be welded to the interface 114.

Once the tower transition adapter 110 is secured to the tower section 12b, the tower section 12c is secured to the tower transition adapter 110. In that regard and with reference to FIGS. 6C and 6D, the section 12c includes a first end 126 that defines a first interface 130 and includes a second end 132 that defines a second interface 134. Second interface 134 may be the top flange 28 (in FIG. 1). The first interface 130 at the first end 126 of the tower section 12c is coupled to the interface 124 at the second end 122 of the tower transition adapter 110. By way of example, the tower transition adapter 110 may be coupled to the end 126 via a flanged connection. Alternatively, the tower transition adapter 110 may be welded to the end 126. The length of the tower transition adapter 110 may vary to locate the second energy generating unit 42 at the desired height H3, with H3 being greater than H1 by the length of the tower transition adapter 110. By way of example, the tower transition adapter 110 may be between about 2 meters and about 30 meters in length. Again, other lengths may be possible depending on the particular application and the desired natural frequency 76 of the modified tower 82 relative to the natural frequency 64 of the tower 12 (shown in FIG. 3C). Although not shown, the tower transition adapter 110 may include an internal platform and ladder that transitions between internal ladders of adjacent sections 12*b* and 12*c*.

Figure 6D:
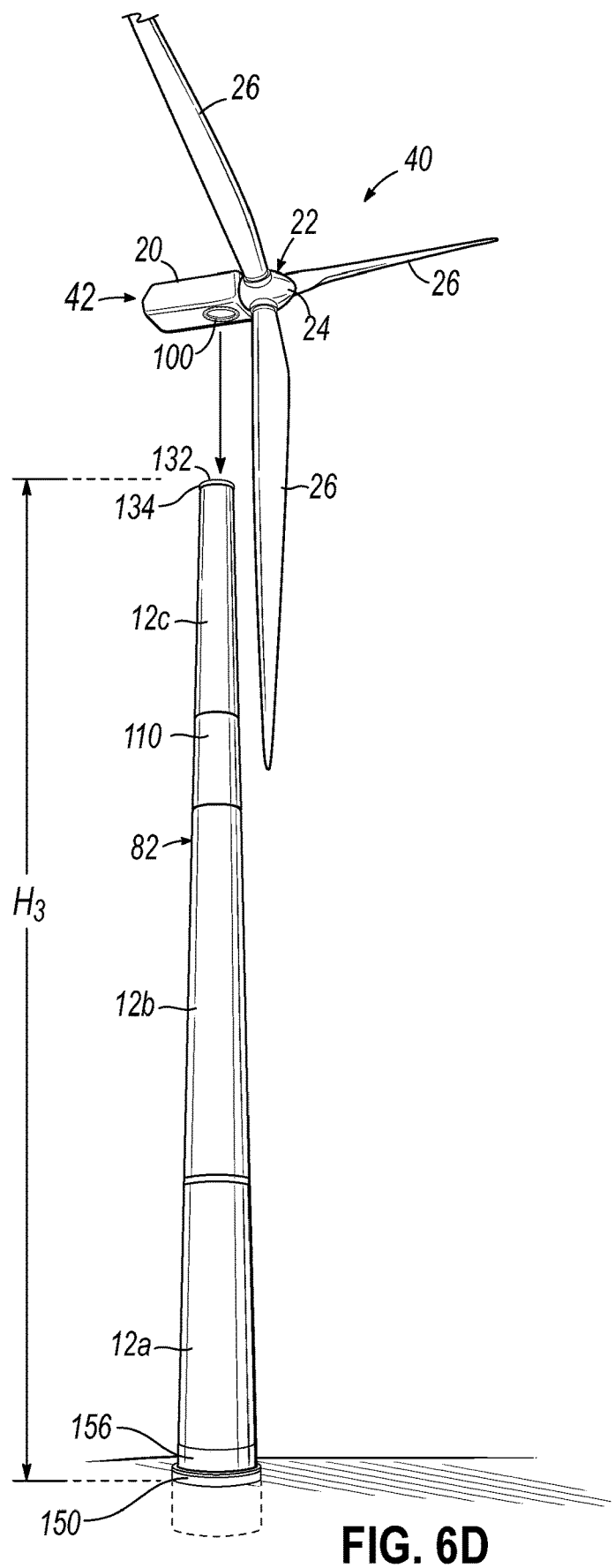

Referring to FIG. 6D, the second energy generating unit 42 may then be coupled to the tower section 12*c*. More particularly, the interface 100 of the second energy generating unit 42 may be coupled to the second interface 134 at the second end 132 of the tower section 12*c*. It should be recognized that in an alternative embodiment, the second energy generating unit 42 may be coupled to the second end 132 of the tower section 12*c* and then that assembly is subsequently coupled to the tower transition adapter 110. Advantageously, where the wind turbine operator is retrofitting the first energy generating unit 14 with the second energy generating unit 42 made by the same manufacturer there may be no need to resolve a mismatch between the modified tower 82, that is, the tower section 12*c*, and the second energy generating unit 42. The size of the interfaces 100 and 134 may be the same. More particularly, the diameter of the interfaces 100 and 134 may be the same. Inserting the tower transition adapter 110 between any two tower sections 12*a*, 12*b*, and 12*c* eliminates a requirement for a transition between the modified tower 82 and the second energy generating unit 42.

In one embodiment, for example, the diameter of the interface 100 may be about 3 meters and the diameter of the second interface 134 may be about 3 meters. Other sizes, however, are possible depending on the particular application. It may be that the addition of the tower transition adapter 110 between the tower sections 12*a* and 12*b* or 12*b* and 12*c* avoids problems associated with design and construction of an adapter capable of receiving the second energy generating unit 42 at an interface of the adapter. It is comparatively more straight forward and less expensive to construct a cylindrical adapter, such as the tower transition adapter 110. By way of example, the tower transition adapter 110 may be constructed with upper and lower L flanges at interfaces 130, 134 that couple to each of the tower sections 12*b* and 12*c* (or between sections 12*a* and 12*b*) whereas an adapter that is to be coupled directly to the second energy generating unit 42 is more difficult to design and more costly to construct.

In this embodiment and similar to the above, it should be recognized that the new height of the modified tower 82 of the retrofitted wind turbine 40 may be greater than or less than the original height of the tower 12 depending on the desired shift in the natural frequency relative to the anticipated rated operation frequencies of the wind turbine 40. The tip height of the blades 26 may also be checked to confirm that the height of the retrofitted wind turbine 40 is within the applicable standards.

Figure 7:
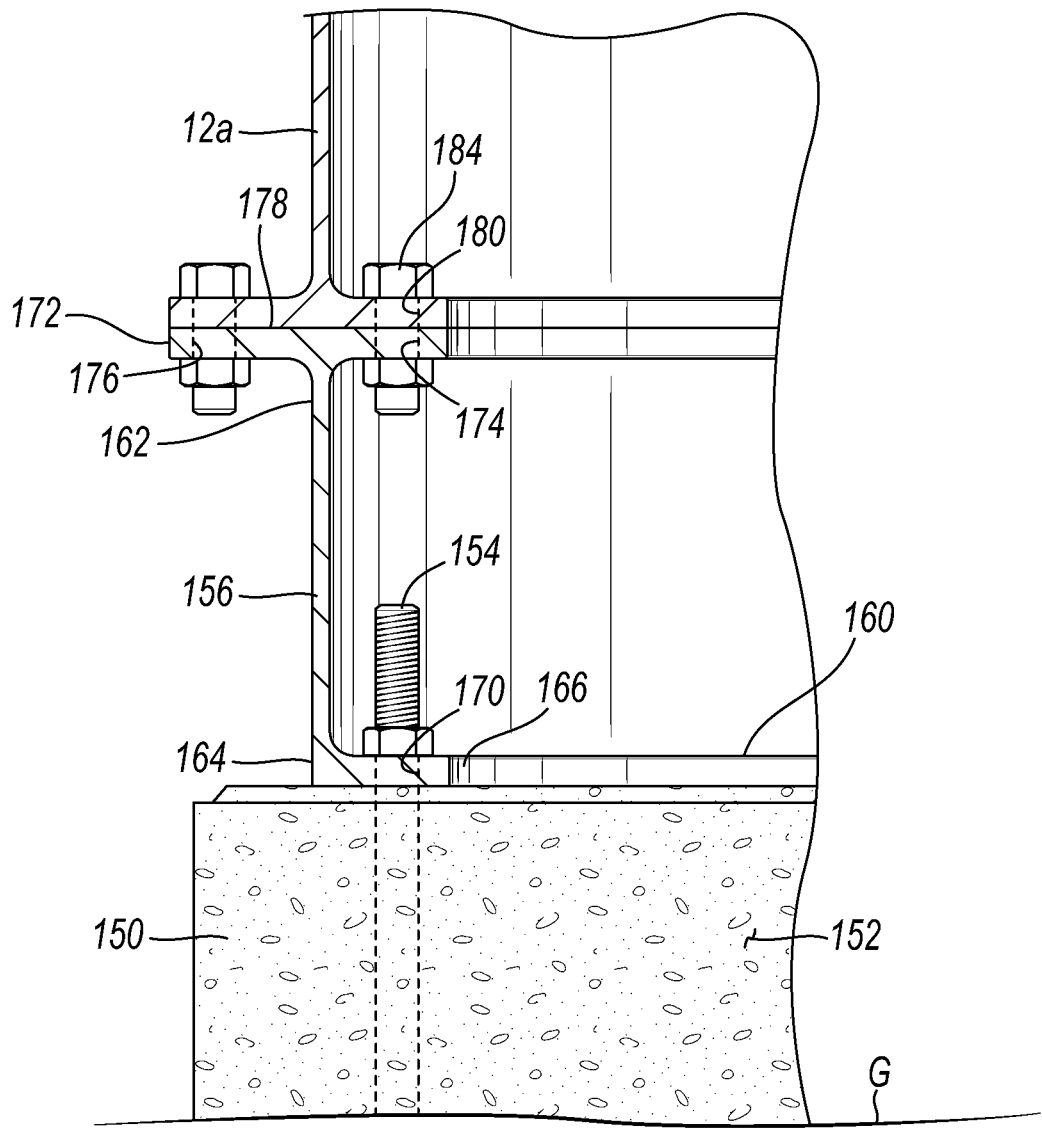
FIG. 7 illustrates a foundation adapter according to one embodiment of the present invention.

Another embodiment of the invention is shown in FIGS. 6D and 7. In addition or as an alternative to the tower transition adapter 86, 110, an adapter may be inserted between the tower 12 and the foundation 16. As is shown in FIG. 6D, the increased height H3 relative to H1 may be wholly or in part because of a foundation adapter 156. In addition to modifying the natural frequency of the tower 12, for example shown in FIG. 3C, the foundation adapter 156 may solve other problems in the industry.

By way of example and with reference to FIG. 7, one problem in the industry is that there is an excess of unused wind turbine foundations 150. The foundations 150 are constructed of steel reinforced concrete 152. Embedded in the concrete 152 are a plurality of anchors 154. These are positioned in the concrete prior to the concrete setting and are therefore not removable without destroying the foundation 150. While not shown, the anchors 154 may be arranged in a ring of predetermined size and adapted to receive a specific tower design. Generally, the size and dimensions of a layout of the anchors 154 are manufacturer specific and may be customized to the site. This presents the specific problem in that one turbine manufacturer may generally not utilize another turbine manufacturer's foundation because of design variations between wind towers. Thus, once the foundation 150 is installed, if not used to secure a wind turbine specific to that foundation, the foundation is not usable.

In one embodiment of the invention, a foundation adapter 156 is coupled between the tower section 12*a* and the foundation 150 where the size and bolt arrangement between the tower section 12*a* and the anchors 154 do not cooperate. In that regard, the foundation adapter 156 includes a shell 160 that defines a sidewall 162. The sidewall 162 may be in the form of a circular cylinder matching the dimensions of the tower section 12*a*. At one end 164 of the sidewall 162, an L-flange 166 extends inwardly with a plurality of through-bores 170 that are spaced apart to each receive an anchor 154. As shown, a nut is threaded onto the anchor 154 and secures the adapter 156 to the foundation 150. Opposite the end 164, at an end 172, a T-flange 178 defines a plurality of interior through bores 174 and a plurality of exterior through bores 176. The bores 174 and 176 align with corresponding bores 180 in the tower section 12*a*. Aligned bores 174 and 180 and 176 and 180 receive bolts or other fasteners 184 so that the tower section 12*a* can be secured to the adapter 156. The bores 174 in the T-flange 178 do not align with the bores 170 in the L-flange 166. In this way, the foundation adapter 156 permits one manufacturer to utilize another manufacturer's unused foundation and advantageously permits a wind turbine to be installed on an otherwise unusable foundation. The adapter 156 also elevates the height of the second energy generating unit 42 and modifies the natural frequency of the modified tower 82 in accordance with the embodiments shown in FIGS. 5A-5C and 6A-6D. While FIG. 7 illustrates an adapter having a lower L-flange and an upper T-flange, embodiments of the invention are not limited to the configuration shown. By way of example, a foundation adapter may include a lower L-flange and an upper L-flange, a lower T-flange and an upper L-flange, or a lower T-flange and an upper T-flange. Furthermore, while a cylindrical adapter is described, the foundation adapter 156 is not limited to a cylinder (e.g., circular). In that regard, the foundation adapter 156 may have a reverse cone configuration that transition between different overall dimensional differences between the foundation 150 and the tower section 12*a*.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A method of retrofitting a wind turbine, the wind turbine having a tower and a first energy generating unit, wherein the first energy generating unit is replaced with a second energy generating unit, the method comprising:

analyzing a first natural frequency of the tower relative to first rated operation frequencies of the tower having the second energy generating unit;

when the first natural frequency lies within the first rated operation frequencies, modifying one or both the tower and the second energy generating unit so that the modified one or both the tower and the second energy generating unit have a second natural frequency and second rated operation frequencies that do not overlap; and replacing the first energy generating unit with the second energy generating unit.

2. The method according to claim 1, wherein modifying one or both the tower and the second energy generating unit includes decreasing a height of the tower from a first tower height to a second tower height, the difference in height between the first tower height and the second tower height being sufficient to reduce the first natural frequency to the second natural frequency and the second natural frequency is not within the second rated operation frequencies.

3. The method according to claim 1, wherein modifying one or both the tower and the second energy generating unit includes increasing a height of the tower from a first tower height to a second tower height, the difference in height between the first tower height and the second tower height being sufficient to change the first natural frequency to the second natural frequency and the second natural frequency is not within the second rated operation frequencies.

4. The method according to claim 3, wherein modifying the tower includes adding an adapter to the tower to increase the first tower height to the second tower height.

5. The method according to claim 4, wherein the tower has at least a first section and a second section and the adapter is cylindrical and adding the adapter includes positioning the adapter between the first section and the second section.

6. The method according to claim 4, wherein the adapter is conical and adding the adapter includes positioning the adapter at a top of the tower and replacing the first energy generating unit with the second energy generating unit includes coupling the second energy generating unit to the adapter.

7. The method according to claim 4, wherein the tower is coupled to a foundation and the adapter is cylindrical, and wherein adding the adapter includes positioning the adapter on the foundation.

8. The method according to claim 4, wherein the tower has at least a first section and a second section and adding the adapter includes:
   removing the first energy generating unit and the first section;
   coupling the adapter to one of the first section and the second section; and
   coupling the other of the first section and the second section to the adapter, the adapter being between the first section and the second section.

9. The method according to claim 1, wherein modifying one or both the tower and the second energy generating unit includes limiting an operating parameter of the second energy generating unit to change a limit of the second rated operation frequencies to be below or above the second natural frequency.

10. The method according to claim 1, wherein modifying one or both the tower and the second energy generating unit includes limiting an operating parameter of the second energy generating unit to reduce an upper limit of the second rated operation frequencies to a frequency below the second natural frequency.

11. The method according to claim 1, further comprising:
    providing a controller and one or more sensors operatively coupled to the wind turbine;
    receiving information from the one or more sensors at the controller for indicating the second rated operation frequencies acting on the tower; and
    altering operation of the second energy generating unit using the controller to change a limit on the second rated operation frequencies so that the second natural frequency is below or above the limit and does not lie within the modified second operation frequency range.

12. The method according to claim 11, wherein altering the operation of the wind turbine so as to change the limit on the second rated operation frequencies on the tower comprises pitching one or more blades on the second energy generating unit.

13. The method according to claim 11, wherein altering the operation of the wind turbine so as to change the limit on the second rated operation frequencies on the tower comprises limiting the speed of the rotor on the second energy generating unit.

* * * * *